(12) United States Patent
Holley et al.

(10) Patent No.: US 8,789,560 B2
(45) Date of Patent: Jul. 29, 2014

(54) FLUID VALVE FITTING HAVING AN INTEGRATED FLUID BYPASS VALVE

(75) Inventors: Eric Holley, Atlanta, GA (US); Daniel Landreth, Johns Creek, GA (US)

(73) Assignee: EchoStar Technologies, L.L.C., Englewood, CO (US)

( * ) Notice: Subject to any disclaimer, the term of this patent is extended or adjusted under 35 U.S.C. 154(b) by 589 days.

(21) Appl. No.: 13/111,341

(22) Filed: May 19, 2011

(65) Prior Publication Data

US 2012/0291901 A1 Nov. 22, 2012

(51) Int. Cl.
*F16K 35/14* (2006.01)
(52) U.S. Cl.
USPC ............ 137/637.1; 137/637.3; 137/597
(58) Field of Classification Search
USPC ............ 137/637, 637.05, 637.1, 637.2, 637.3, 137/597
See application file for complete search history.

(56) References Cited

U.S. PATENT DOCUMENTS

| | | | | |
|---|---|---|---|---|
| 4,345,622 | A * | 8/1982 | Henningsson | 137/637.1 |
| 5,704,398 | A * | 1/1998 | Baker | 137/637.1 |
| 6,415,819 | B1 * | 7/2002 | Pas et al. | 137/637.1 |
| 2011/0061744 | A1 | 3/2011 | Zillig et al. | |

FOREIGN PATENT DOCUMENTS

AT 414163 B 9/2006
EP 0607770 A1 7/1994

OTHER PUBLICATIONS

European Patent Office "International Search Report and Written Opinion" mailed Aug. 14, 2012 for International Appln. No. PCT/US2012/037559, filed May 11, 2012.

* cited by examiner

*Primary Examiner* — Kevin Lee
(74) *Attorney, Agent, or Firm* — Ingrassia Fisher & Lorenz, P.C.

(57) ABSTRACT

A fluid valve fitting has an incoming conduit with an inlet, an outlet, and a coupling assembly for its outlet, and an outgoing conduit with an inlet, an outlet, and a coupling assembly for its inlet. The fitting also has a bypass conduit between the incoming and the outgoing conduits, an inflow valve in the incoming conduit, an outflow valve in the outgoing conduit, and a bypass valve in the bypass conduit. An actuator assembly is coupled to lock mechanisms of the coupling assemblies, the inflow valve, the outflow valve, and the bypass valve. Operation of the actuator assembly concurrently operates the lock mechanisms, the inflow valve, the outflow valve, and the bypass valve.

21 Claims, 9 Drawing Sheets

FLUID VALVE FITTING HAVING AN INTEGRATED FLUID BYPASS VALVE

TECHNICAL FIELD

Embodiments of the subject matter described herein relate generally to fluid delivery systems, such as fluid-based cooling systems. More particularly, embodiments of the subject matter relate to a fluid valve fitting operable in a flow-through state or a fluid bypass state.

BACKGROUND

Fluid delivery, fluid transfer, and fluid-based cooling systems are well known. For example, water or other coolants can be used to cool or otherwise thermally condition electronic equipment such as computer equipment, server equipment, etc. The fluid coolant is typically provided to the equipment using flexible hoses, pipes, and/or other suitable conduits. Fluid couplers, fittings, and connection devices can be used to establish fluid connectivity with the ports and fluid inlets/outlets of the equipment. Care must be taken when connecting and disconnecting fluid conduits to and from the equipment so that the coolant does not spill onto the equipment. This is particularly important when dealing with sensitive equipment such as electronics and computer equipment.

Accordingly, it is desirable to have a fluid valve fitting that can be safely and reliably used with fluid cooling applications where coolant spills are to be avoided. In addition, it is desirable to have a fluid valve fitting that is effective and easy to use. Furthermore, other desirable features and characteristics will become apparent from the subsequent detailed description and the appended claims, taken in conjunction with the accompanying drawings and the foregoing technical field and background.

BRIEF SUMMARY

A fluid valve fitting according to an exemplary embodiment includes an incoming conduit, an outgoing conduit, and a bypass conduit. The incoming conduit has a first inlet, a first outlet, and a first coupling assembly for the first outlet, and the first coupling assembly has a first lock mechanism. The outgoing conduit has a second inlet, a second outlet, and a second coupling assembly for the second inlet, and the second coupling assembly has a second lock mechanism. The bypass conduit is fluidly coupled between the incoming conduit and the outgoing conduit. The fitting also includes an inflow valve located in the incoming conduit between the first inlet and the first outlet. The inflow valve can be positioned in an open inflow valve state and a closed inflow valve state. The fitting also includes an outflow valve located in the outgoing conduit between the second inlet and the second outlet. The outflow valve can be positioned in an open outflow valve state and a closed outflow valve state. The fitting also includes a bypass valve located in the bypass conduit between the incoming conduit and the outgoing conduit. The bypass valve can be positioned in an open bypass valve state and a closed bypass valve state. The fitting also has an actuator assembly coupled to the first lock mechanism, the second lock mechanism, the inflow valve, the outflow valve, and the bypass valve. Operation of the actuator assembly concurrently operates the first lock mechanism, the second lock mechanism, the inflow valve, the outflow valve, and the bypass valve.

Another exemplary embodiment of a fluid valve fitting is also provided. The fitting includes: a conduit comprising an inlet, an outlet, and a locking connector assembly for the outlet; a rotatable valve located in the conduit and configured to be positioned in an open valve state and a closed valve state; an axle coupled to the rotatable valve and configured to rotate in response to rotation of the rotatable valve; a cam coupled to the axle and configured to rotate in response to rotation of the axle; and a pushrod having a first end that cooperates with the cam and having a second end that cooperates with the locking connector assembly, wherein rotation of the cam translates the pushrod. The fitting also has an actuator assembly coupled to the rotatable valve to transition the rotatable valve between the open valve state and the closed valve state. Operation of the actuator assembly rotates the rotatable valve while concurrently operating the locking connector assembly via the pushrod.

Also provided is yet another exemplary embodiment of a fluid valve fitting. The fitting includes: an incoming conduit having a first inlet, a first outlet, and a first locking quick disconnect assembly for the first outlet; an outgoing conduit having a second inlet, a second outlet, and a second locking quick disconnect assembly for the second inlet; and a bypass conduit fluidly coupled between the incoming conduit and the outgoing conduit. The fitting also has an inflow valve, an outflow valve, and a bypass valve. The inflow valve is located in the incoming conduit between the first inlet and the first outlet, and it rotates about an inflow axle between an open inflow valve state and a closed inflow valve state. The outflow valve is located in the outgoing conduit between the second inlet and the second outlet, and it rotates about an outflow axle between an open outflow valve state and a closed outflow valve state. The bypass valve is located in the bypass conduit between the incoming conduit and the outgoing conduit, and it rotates about a bypass axle between an open bypass valve state and a closed bypass valve state. The fitting also includes: an inflow axle cam coupled to the inflow axle to rotate in response to rotation of the inflow axle; an outflow axle cam coupled to the outflow axle to rotate in response to rotation of the outflow axle; an inflow pushrod to engage the inflow axle cam and to cooperate with the first locking quick disconnect assembly; an outflow pushrod to engage the outflow axle cam and to cooperate with the second locking quick disconnect assembly; and an actuator assembly coupled to the bypass axle. Operation of the actuator assembly concurrently operates the bypass valve, the inflow valve, the outflow valve, the first locking quick disconnect assembly, and the second locking quick disconnect assembly.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. In addition, certain terminology may also be used in the following description for the purpose of reference only, and thus are not intended to be limiting. For example, terms such as "upper", "lower", "above", and "below" may be used to refer to directions in the drawings to which reference is made. Terms such as "front", "back", "rear", "side", "outboard", and "inboard" may be used to describe the orientation and/or location of portions of a component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Figure 1:
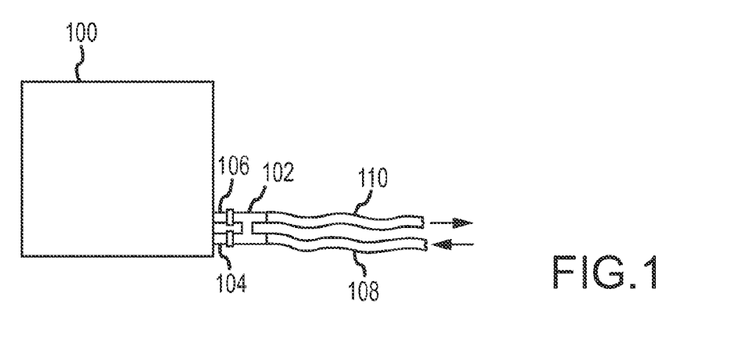
FIG. 1 is a simplified diagram that depicts a component coupled to a fluid valve fitting that accommodates incoming and outgoing fluid flow to and from the component.

The subject matter presented here relates to fluid fittings, valves, and couplers. More specifically, the subject matter relates to a bypass valve fitting that can connect a component (such as computer equipment) to plumbing used for coolant. In an application with a plurality of components to be cooled, each component can include one input port and one output port for receiving and outputting coolant that is used to cool each individual component. A bypass valve fitting of the type described here can be coupled to the input and output port to receive coolant from the plumbing system. In this regard, FIG. 1 is a simplified diagram that depicts a component 100 coupled to a fluid valve fitting 102 that accommodates incoming and outgoing fluid flow to and from the component 100. The component 100 includes or cooperates with an input port 104 and an output port 106, and the fluid valve fitting 102 is physically and fluidly coupled to the input port 104 and to the output port 106 in a fluid-tight manner. The coolant is delivered to the fluid valve fitting 102 by way of an inlet hose 108 (or any suitable conduit), and is carried away from the fluid valve fitting 102 by way of an outlet hose 110 (or any suitable conduit). The inlet hose 108 and the outlet hose 110 may in turn be routed to the plumbing system and the coolant source, or they could be routed to another component, thus forming a chain of components that are in fluid communication with one another.

Figure 2:
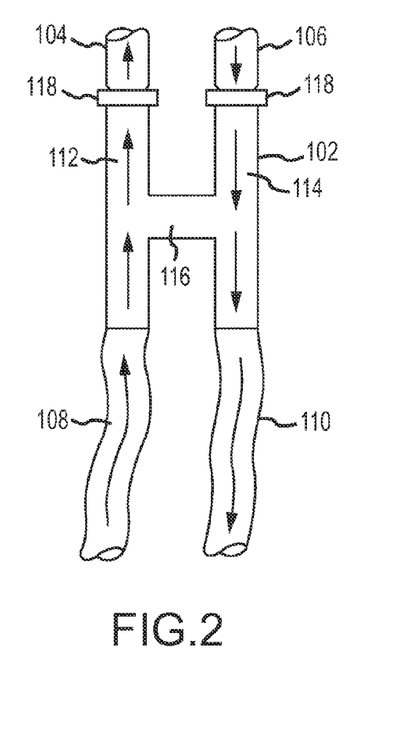
FIG. 2 is a schematic representation of the fluid valve fitting in its flow-through state and connected to the component.

FIG. 2 is a schematic representation of the fluid valve fitting 102 in its flow-through state and connected to the input port 104 and the output port 106 of the component 100. In the flow-through or open state, valves and other components of the fluid valve fitting 102 are configured such that the coolant or fluid flows from the inlet hose 108, through an incoming conduit 112 of the fluid valve fitting 102, and to an external connector such as the input port 104 (as schematically depicted by the upward pointing arrows in FIG. 2), and such that the coolant or fluid flows from an external connector such as the output port 106, through an outgoing conduit 114 of the fluid valve fitting 102, and to the outlet hose 110 (as schematically depicted by the downward pointing arrows in FIG. 2). Notably, in the flow-through state the fluid valve fitting 102 inhibits or prevents fluid flow across a bypass conduit 116 that is coupled between and joins the incoming conduit 112 and the outgoing conduit 114.

The fluid valve fitting 102 can be removed from the input port 104 and the output port 106 of the component 100 as needed or desired. To facilitate such removal, the valves and other components of the fluid valve fitting 102 are first reconfigured into a bypass state. This action automatically bypasses the open mating ports of the fluid valve fitting 102, thus inhibiting or preventing coolant from exiting the normal flow channel and forcing the coolant to flow through the bypass conduit 116 back to the plumbing system. Notably, the transition from the flow-through state to the bypass state also automatically unlocks the fluid valve fitting 102 from the input port 104 and the output port 106, as described in more detail below.

In practice, the input port 104 and the output port 106 could be implemented as male-type quick disconnect connectors that mate with and are otherwise compatible with female-type quick disconnect connectors, coupling assemblies, or locking mechanisms for the outlet and the inlet of the fluid valve fitting 102. As depicted in FIG. 2, the input port 104 and the output port 106 may each be tapered to permit insertion into the mating sections of the fluid valve fitting 102. The exemplary embodiment described here includes locking female-type quick disconnect assemblies 118 for the couplings that mate with the input port 104 and the output port 106. In accordance with conventional quick disconnect connectors and assemblies, the male portion and/or the female portion of a quick disconnect assembly includes a seal, a gasket, an O-ring, or the like to provide a fluid-tight coupling. As described in more detail below, the quick disconnect assemblies 118 preferably include or cooperate with lock mechanisms that prevent accidental removal of the fluid valve fitting 102 from the component 100, and that prevent accidental actuation of the valves into the flow-through state before the fluid valve fitting 102 is attached to the component 100.

Figure 3:
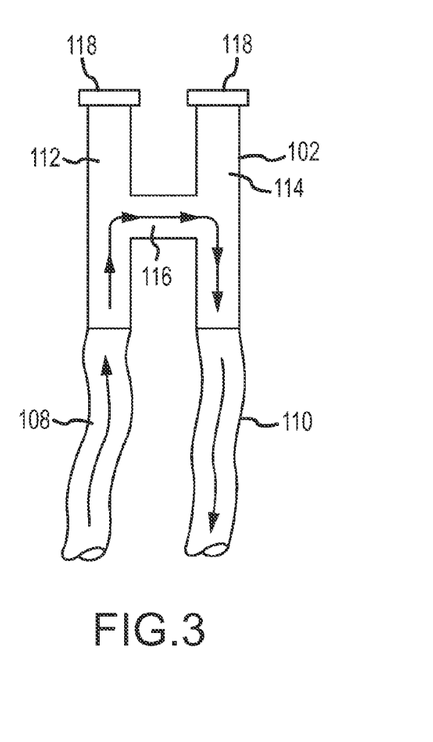
FIG. 3 is a schematic representation of the fluid valve fitting in its bypass state and disconnected from the component.

FIG. 3 is a schematic representation of the fluid valve fitting 102 in its bypass state and disconnected from the input port 104 and the output port 106 of the component. In the bypass state, the inlet hose 108 and the outlet hose 110 can remain coupled to the fluid valve fitting 102 to accommodate fluid flow through the fluid valve fitting and, if necessary, fluid flow to one or more other components to be cooled. In the bypass state, the fluid flows from the inlet hose 108, into the entry section of the incoming conduit 112, through the bypass conduit 116, through the exit section of the outgoing conduit 114, and to the outlet hose 110. The bypass path through the fluid valve fitting 102 is schematically depicted by the U-turn shaped arrows in FIG. 3.

Figure 4:
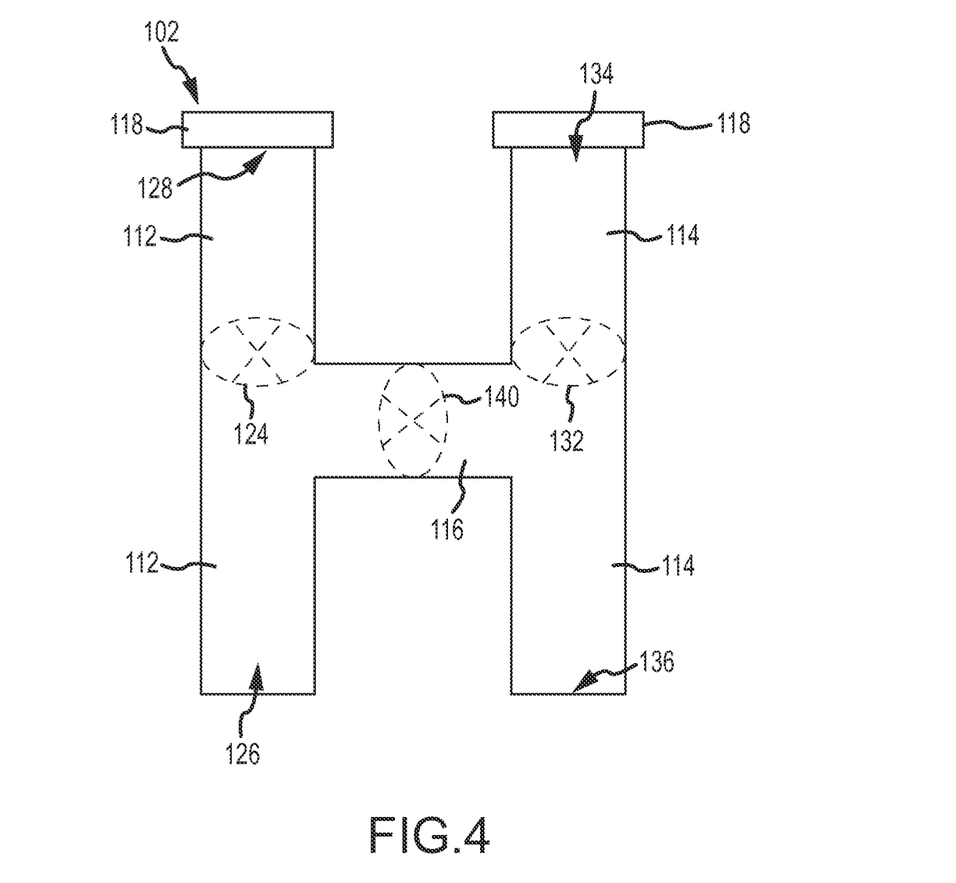
FIG. 4 is a schematic top view of the fluid valve fitting, with its valves depicted in phantom lines.

The fluid valve fitting 102 can be transitioned between its bypass and flow-through states by operating its valves. FIG. 4 is a schematic top view of the fluid valve fitting 102, with its internal valves depicted in phantom. This particular embodiment of the fluid valve fitting 102 employs three internal valves: an inflow valve 124 located in the incoming conduit 112 between an inlet 126 of the incoming conduit 112 and an outlet 128 of the incoming conduit 112; an outflow valve 132 located in the outgoing conduit 114 between an inlet 134 of the outgoing conduit 114 and an outlet 136 of the outgoing conduit 114; and a bypass valve 140 located in the bypass conduit 116 between the incoming conduit 112 and the outgoing conduit 114. Referring again to FIGS. 1-3, the inlet 126 may be configured for fluid-tight coupling to a fluid inflow hose or conduit, such as the inlet hose 108, and the outlet 136 may be configured for fluid-tight coupling to a fluid outflow hose or conduit, such as the outlet hose 110.

The inflow valve 124 can be positioned in at least two states: an open inflow valve state and a closed inflow valve state. In accordance with well known valve operating principles, the inflow valve 124 accommodates fluid flow when it is open, and inhibits or prevents fluid flow when it is closed. Likewise, the outflow valve 132 can be positioned in at least two states: an open outflow valve state and a closed outflow valve state. In accordance with well known valve operating principles, the outflow valve 132 accommodates fluid flow when it is open, and inhibits or prevents fluid flow when it is closed. Similarly, the bypass valve 140 can be positioned in at least two states: an open bypass valve state and a closed bypass valve state. In accordance with well known valve operating principles, the bypass valve 140 accommodates fluid flow when it is open, and inhibits or prevents fluid flow when it is closed.

Figure 5:
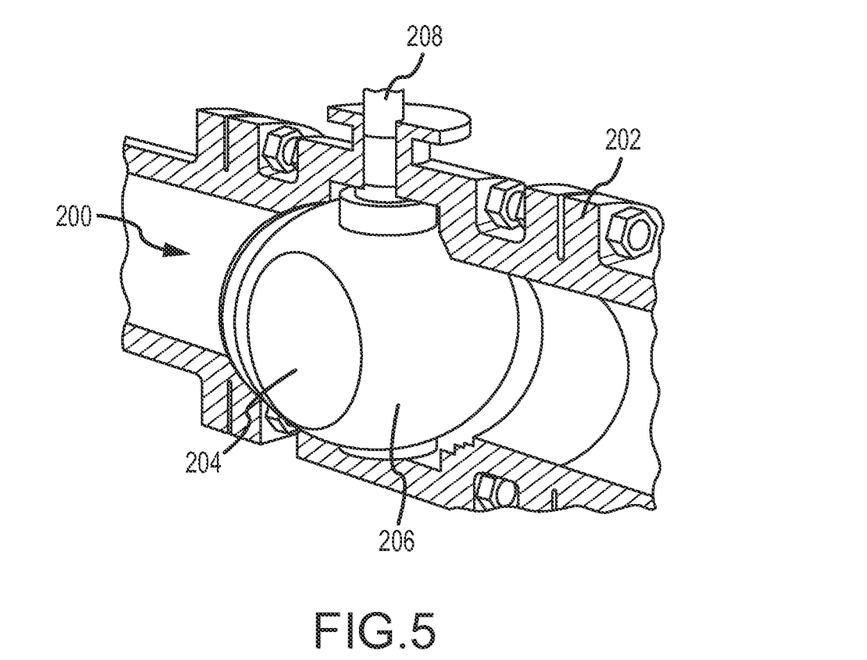
FIG. 5 is a perspective cutaway view of an exemplary ball valve suitable for use with the fluid valve fitting.

The valves 124, 132, 140 may be realized using any known valve type, technology, or arrangement. For example, the valves 124, 132, 140 could be implemented as gate valves, ball valves, butterfly valves, check valves, needle valves, or the like. Moreover, different valve types and technologies could be used in the fluid valve fitting 102, and there is no requirement for all of the valves 124, 132, 140 to be of a common type. In certain embodiments, the valves 124, 132, 140 are implemented as axle-mounted or axle-driven rotatable ball valves that can be rotated between the open and closed positions. In this regard, FIG. 5 is a perspective cutaway view of an exemplary ball valve 200 positioned within a fluid conduit 202. FIG. 5 depicts the ball valve in its closed position where a hole 204 through a ball 206 is not accessible to the fluid flowing within the conduit 202. The ball 206 can be rotated within the conduit 202 by actuating, manipulating, or otherwise operating an axle 208 that is coupled to the ball 206. In other words, rotation of the axle 208 results in rotation of the ball 206 (and vice versa). Thus, the ball 206 can be rotated such that the hole 204 is aligned with the flow path of the conduit 202 to allow fluid to flow through the hole 204.

Referring again to FIGS. 2-4, when the fluid valve fitting 102 is in the bypass state, the inflow valve 124 is positioned in the closed inflow valve state, the outflow valve 132 is positioned in the closed outflow valve state, and the bypass valve 140 is positioned in the open bypass valve state. This valve configuration is used to inhibit fluid flow from the inlet 126 to the outlet 128, to inhibit fluid flow from the inlet 134 to the outlet 136, and to allow fluid flow from the inlet 126 to the outlet 136 via the bypass conduit 116. In contrast, when the fluid valve fitting 102 is in the flow-through state, the inflow valve 124 is positioned in the open inflow valve state, the outflow valve 132 is positioned in the open outflow valve state, and the bypass valve 140 is positioned in the closed bypass valve state. This valve configuration is used to allow fluid flow from the inlet 126 to the outlet 128, to allow fluid flow from the inlet 134 to the outlet 136, and to inhibit fluid flow between the incoming conduit 112 and the outgoing conduit 114.

The fluid valve fitting 102 can be fabricated from a strong, tough, fluid-resistant, and corrosion-resistant material, such as, without limitation: aluminum; copper; plastic; or any material commonly used for plumbing or cooling system fittings and couplings. The size, shape, and critical dimensions of the fluid valve fitting 102 may vary from one embodiment to another to accommodate the arrangement and configuration of the input port 104 and the output port 106 of the component 100. For example, the spacing between the incoming conduit 112 and the outgoing conduit 114 may be selected and fixed in accordance with the spacing between the input port 104 and the output port 106 of the component 100. Alternatively (or additionally), the fluid valve fitting 102 could be adjustable such that the distance between the incoming conduit 112 and the outgoing conduit 114 can be altered as needed to mate with the input port 104 and the output port 106.

Figure 6:
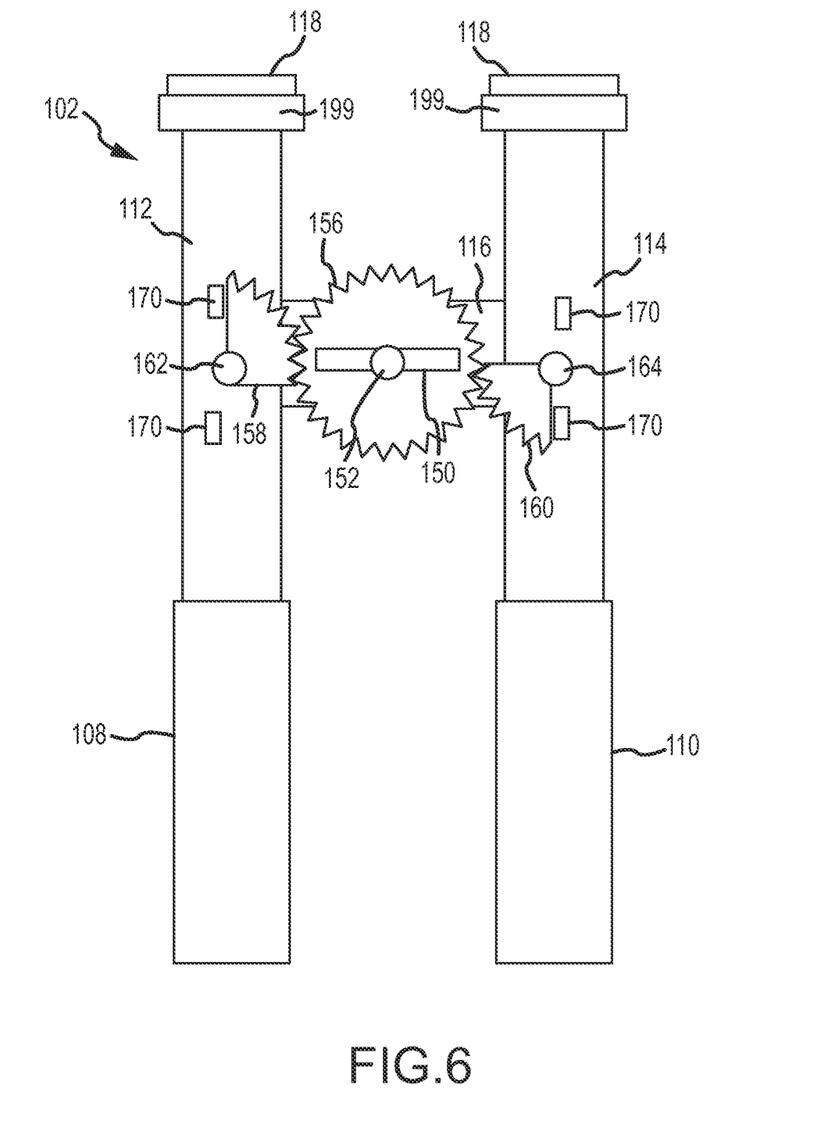
FIG. 6 is a schematic top view of the fluid valve fitting in its bypass state and disconnected from the component.
Figure 7:
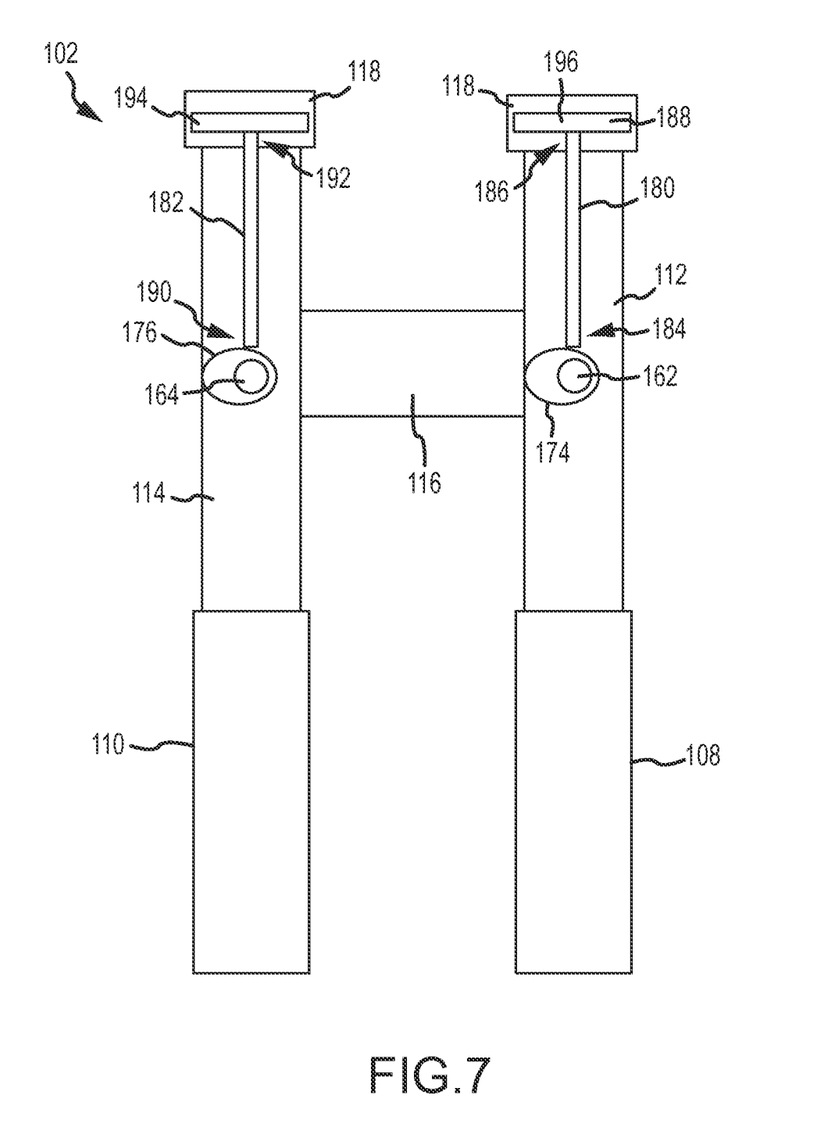
FIG. 7 is a schematic bottom view of the fluid valve fitting in its bypass state and disconnected from the component.

FIG. 6 is a schematic top view of the fluid valve fitting 102 in its bypass state, and FIG. 7 is a schematic bottom view of the fluid valve fitting 102 in its bypass state. For ease of illustration and for the sake of clarity, FIG. 6 and FIG. 7 do not depict any of the internal valves 124, 132, 140. Certain embodiments of the fluid valve fitting 102 include an actuator assembly 150 for operating the valves 124, 132, 140, and for operating lock mechanisms of the fluid valve fitting 102. In practice, the actuator assembly 150 may include a number of elements, components, and/or devices that are coupled or linked together in a cooperating manner. For example, the actuator assembly 150 may be realized as a handle, a knob, or a lever that can be manipulated to rotate one or more of the valves 124, 132, 140. In the exemplary embodiment shown and described here, the actuator assembly 150 is connected to an axle 152. The axle 152 may be coupled to the bypass valve 140 or it may be an integrated element of the bypass valve 140. Thus, operation (rotation) of the actuator assembly 150 results in rotation of the axle 152, which in turn results in rotation of the bypass valve 140. In other words, the bypass valve 140 is configured to be rotated about the axle 152, between the open bypass valve state and the closed bypass valve state.

The fluid valve fitting 102 may also include a gear mechanism having any number of gears for coupling the inflow valve 124, the outflow valve 132, and the bypass valve 140 to the actuator assembly 150. FIG. 6 schematically depicts one exemplary implementation having a primary gear 156 (which can be coupled to the bypass valve 140 via the axle 152), a secondary inflow gear 158 that meshes and cooperates with the primary gear 156, and a secondary outflow gear 160 that meshes and cooperates with the primary gear 156. The secondary inflow gear 158 may be coupled to an axle 162, which is coupled to the inflow valve 124 or is an integrated element of the inflow valve 124. Similarly, the secondary outflow gear 160 may be coupled to an axle 164, which is coupled to the outflow valve 132 or is an integrated element of the outflow valve 132. Accordingly, operation of the actuator assembly 150 rotates the primary gear 156 (clockwise or counterclockwise), which concurrently rotates the secondary inflow gear 158 and the secondary outflow gear 160. Rotation of the secondary inflow gear 158 imparts rotation to the corresponding axle 162, which in turn rotates the inflow valve 124. Likewise, rotation of the secondary outflow gear 160 imparts rotation to the corresponding axle 164, which in turn rotates the outflow valve 132. Therefore, operation of the actuator assembly 150 automatically and concurrently rotates all three of the valves 124, 132, 140 such that the fluid valve fitting 102 can be transitioned between its bypass state and its flow-through state in a quick and easy manner.

Although not required, the exemplary embodiment of the fluid valve fitting 102 employs gear stops 170 (see FIG. 6) to limit the amount of rotation of the secondary inflow gear 158 and the secondary outflow gear 160. The gear stops 170 may be implemented as protrusions, pins, or any appropriate features that are able to inhibit or prevent rotation of the secondary inflow gear 158 and the secondary outflow gear 160 past a predetermined position. As depicted in FIG. 6, one gear stop 170 can be used to limit clockwise rotation of the secondary inflow gear 158, another gear stop 170 can be used to limit counterclockwise rotation of the secondary inflow gear 158, another gear stop 170 can be used to limit clockwise rotation of the secondary outflow gear 160, and yet another gear stop 170 can be used to limit counterclockwise rotation of the secondary outflow gear 160. Notably, the gear stops 170 effectively limit rotation of the bypass valve 140 due to the manner in which the primary gear 156 is linked to the secondary inflow gear 158 and the secondary outflow gear 160. It should be appreciated that an embodiment of the fluid valve fitting 102 could utilize more or less than four gear stops 170 and/or other techniques or features to limit rotation of the valves 124, 132, 140.

FIG. 7 is a schematic bottom view that corresponds to the state of the fluid valve fitting 102 shown in FIG. 6. As depicted in FIG. 7, the axle 162 may extend through the inflow valve 124, or it may be split into two sections. Likewise, the axle 164 may extend through the outflow valve 132, or it may be split into two sections. In either arrangement, the axles 162, 164 extend through the incoming conduit 112 and through the outgoing conduit 114 for respective coupling to an inflow axle cam 174 and an outflow axle cam 176. The inflow axle cam 174 is coupled to the axle 162 such that the inflow axle cam 174 rotates in response to rotation of the axle 162. Likewise, the outflow axle cam 176 is coupled to the axle 164 such that the outflow axle cam 176 rotates in response to rotation of the axle 164. As shown in FIG. 7, the axle cams 174, 176 are non-circular and eccentric (which comports with the ordinary and well-established definition of a cam).

The fluid valve fitting 102 may include linkage assemblies that are operatively associated with the axle cams 174, 176. These linkage assemblies cooperate with, engage, and actuate lock mechanisms of the quick disconnect assemblies 118 in response to rotation of the axle cams 174, 176. Thus, the actuator assembly 150 (see FIG. 6) is directly or indirectly coupled to the lock mechanisms, and to the valves 124, 132, 140, such that operation of the actuator assembly 150 concurrently operates the lock mechanisms and the valves 124, 132, 140, as will be discussed in detail below.

For the illustrated embodiment, the linkage assemblies are realized as pushrods 180, 182. The pushrod 180 has a cam end 184 that cooperates with the inflow axle cam 174, and a lock end 186 that cooperates with a lock mechanism 188 (e.g., a gate) for the incoming conduit 112. Similarly, the pushrod 182 has a cam end 190 that cooperates with the outflow axle cam 176, and a lock end 192 that cooperates with a lock mechanism 194 (e.g., a gate) for the outgoing conduit 114. The manner in which the pushrods 180, 182 cooperate with the lock mechanisms 188, 194 will be described in more detail with reference to FIG. 8, which is a schematic side view of the incoming conduit 112 (in the bypass state), and with reference to FIG. 9, which is a schematic elevation view of the coupling assembly of the incoming conduit 112 (in the bypass state). For clarity and ease of illustration, the inflow valve 124 is not shown in FIG. 8 (or in FIG. 12). It should be appreciated that the corresponding components for the outgoing conduit 114 are similarly configured and, therefore, will not be separately described here.

When the fluid valve fitting 102 is in the bypass state (as depicted in FIGS. 6-9), the lock mechanism 188 is unlocked to enable the quick disconnect assembly 118 to receive and mate with the input port 104 (which is configured as a compatible quick disconnect fitting). In other words, the pushrod 180 allows the lock mechanism 188 to be moved to accommodate the quick disconnect engagement. Moreover, in the bypass state the lock end 186 of the pushrod 180 rests at or near an extending portion 196 of the lock mechanism 188 (see FIG. 8), and it does not reside within a locking hole 197 formed within the lock mechanism 188 (see FIG. 9). Consequently, the pushrod 180 serves to lock the inflow axle cam 174 in position because the extending portion 196 of the lock mechanism 188 inhibits translation of the pushrod 180, which would be required to accommodate rotation of the inflow axle cam 174. FIG. 7 illustrates how the pushrod 180 functions to inhibit rotation of the inflow axle cam 174 and, effectively, to lock the inflow axle cam 174 in position. In other words, when the fluid valve fitting 102 is in the bypass state, rotation of the inflow axle cam 174 is inhibited, which in turn inhibits rotation of the axle 162, which in turn inhibits rotation of the inflow valve 124 to the open inflow valve state.

The pushrod 182 also functions to inhibit rotation of the outflow valve 132 when the fluid valve fitting 102 is in the bypass state. Moreover, the gear mechanism that couples the valves 124, 132, 140 together will inhibit rotation of the bypass valve 140, the axle 152, and the actuator assembly 150. In other words, the actuator assembly 150 will effectively be locked in the bypass position as long as the fluid valve fitting 102 is in the bypass state and not connected to the component 100. This feature makes it difficult if not impossible for a user to accidentally change the state of the valves 124, 132, 140 until after the fluid valve fitting 102 has been connected to the component. Thus, the coolant will remain flowing through the fluid valve fitting 102 and spillage will be minimized.

Figure 8:
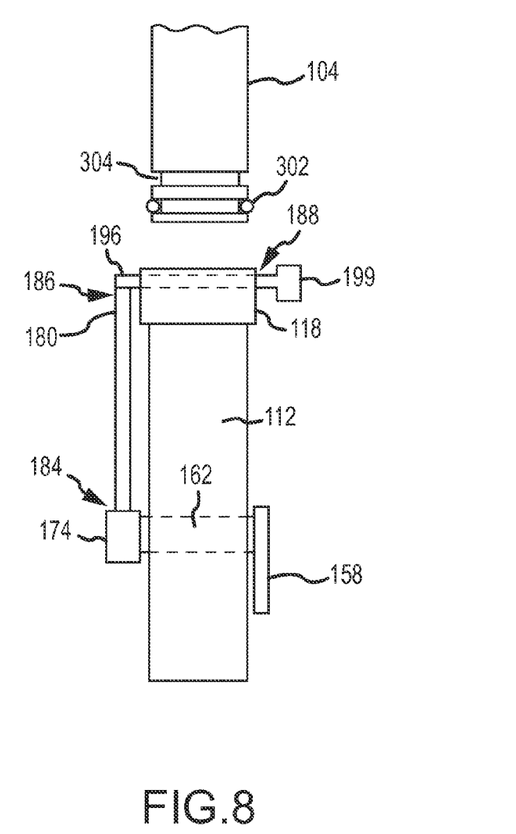
FIG. 8 is a schematic side view of the fluid valve fitting in its bypass state and disconnected from the component.
Figure 9:
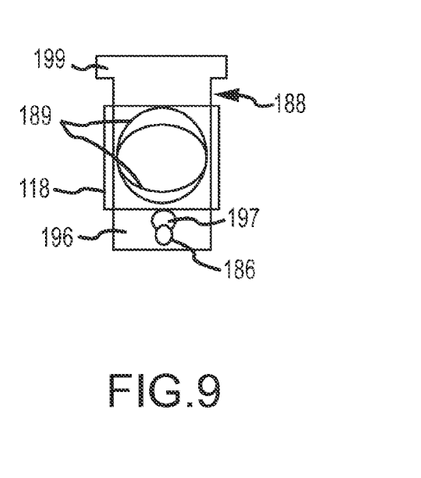
FIG. 9 is a schematic elevation view of a coupling assembly, shown when the fluid valve fitting is in its bypass state and disconnected from the component.

As mentioned above, when the fluid valve fitting 102 is in the bypass state, the lock mechanisms 188, 194 allow the quick disconnect assemblies 118 to receive and mate with the input port 104 and the output port 106 of the component 100. Referring to FIG. 8, the input port 104 may include an O-ring 302 (and/or one or more other seals) and a gate groove 304 that is sized and shaped to accommodate a portion of the lock mechanism 188 after the input port 104 is received in the quick disconnect assembly 118. In this regard, the input port 104 can be inserted into the quick disconnect assembly 118 such that the lock mechanism 188 (which may be spring loaded) moves to accommodate the input port 104 and thereafter "snaps" back into place to hold the input port 104 in place. As shown in FIG. 9, the lock mechanism 188 has a fitting hole 189 formed therein that accommodates the input port 104. After the lock mechanism 188 snaps back into place, a portion of the lock mechanism 188 enters the gate groove 304 to hold and secure the end of the input port 104 inside the quick disconnect assembly 118. In addition, the lock mechanism 188 is displaced slightly after the input port 104 is inserted in the quick disconnect assembly 118. As described in greater detail below, displacement of the lock mechanism 188 causes the locking hole 197 to align with the lock end 186 of the pushrod 180, which makes it possible for the pushrod 180 to move (translate) within the locking hole 197. The same mechanism can be utilized for the output port 106 and the quick disconnect assembly 118 for the outgoing conduit 114.

After the fluid valve fitting 102 has been secured to the input port 104 and the output port 106, the lock mechanisms 188, 194 "free" the pushrods 180, 182 such that the actuator assembly 150 (see FIG. 6) can be manipulated and operated to transition the fluid valve fitting 102 from the bypass state to the flow-through state. To this end, the actuator assembly 150 can be rotated (counterclockwise for this example) until further rotation is prevented by the gear stops 170 (see FIG. 6). As mentioned previously, rotation of the actuator assembly 150 concurrently and simultaneously operates the valves 124, 132, 140 via the gear mechanism and the valve axles 152, 162, 164. Notably, rotation of the axles 162, 164 causes rotation of the axle cams 174, 176, which in turn forces the lock ends 186, 192 of the pushrods 180, 182 upward and through the locking holes 197 of the lock mechanisms 188.

Figure 10:
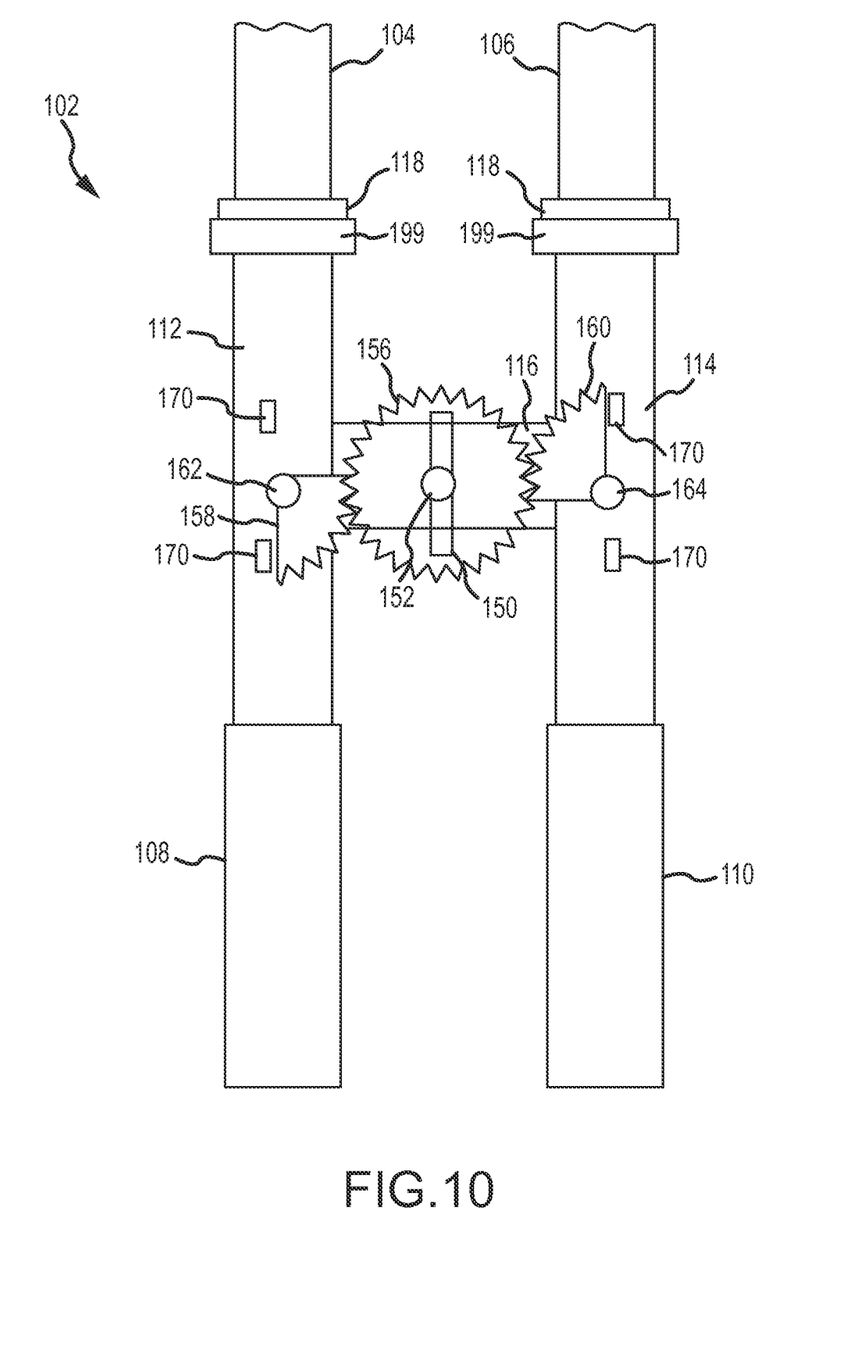
FIG. 10 is a schematic top view of the fluid valve fitting in its flow-through state and connected to the component.

The flow-through state of the fluid valve fitting 102 is depicted in FIGS. 10-13. FIG. 10 shows how the actuator assembly 150 has been rotated in a counterclockwise direction (relative to that shown in FIG. 6), resulting in rotation of the axles 162, 164.

Figure 11:
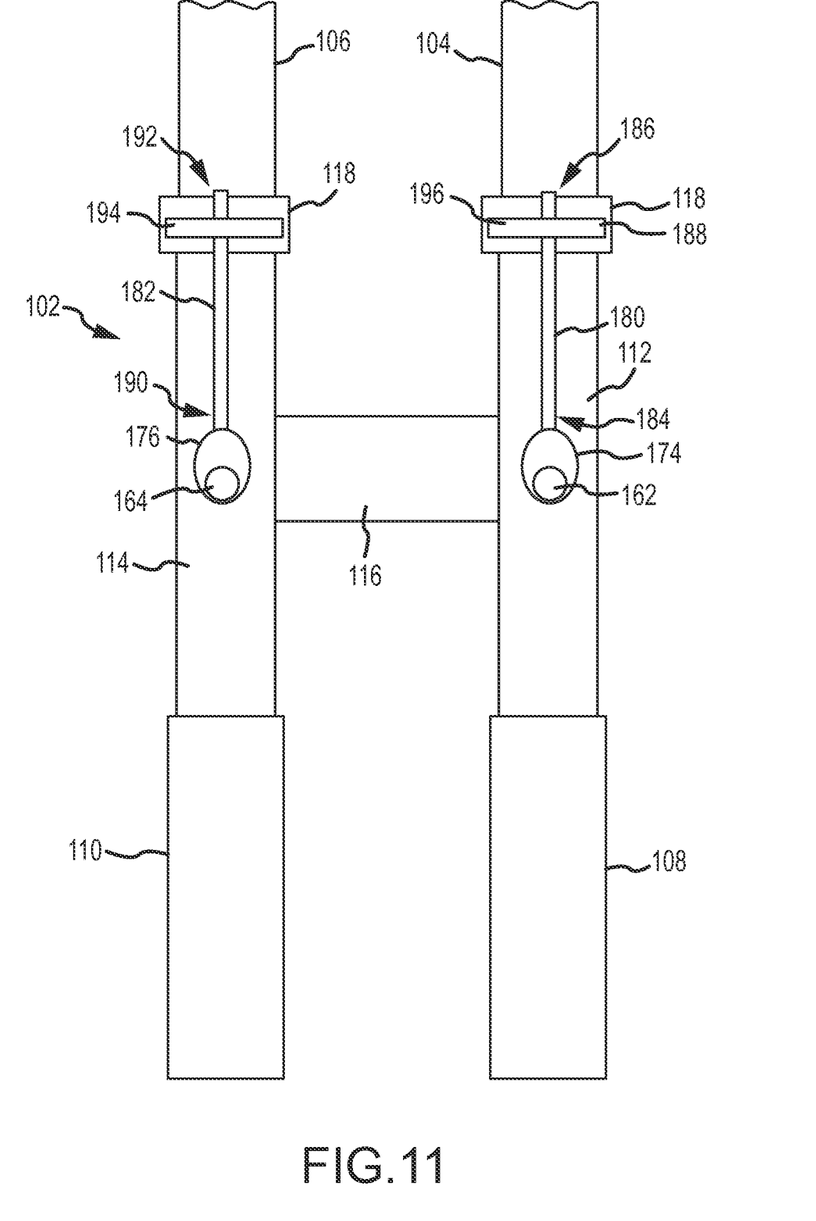
FIG. 11 is a schematic bottom view of the fluid valve fitting in its flow-through state and connected to the component.
Figure 12:
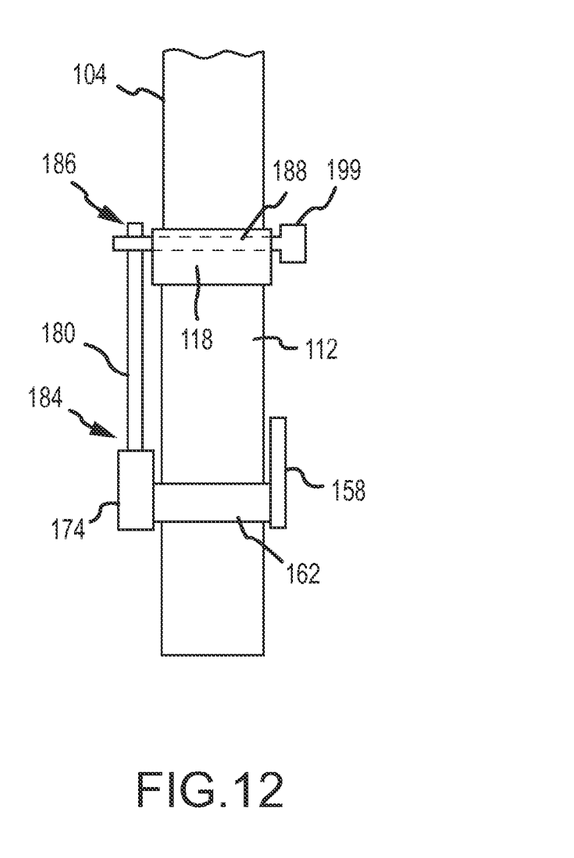
FIG. 12 is a schematic side view of the fluid valve fitting in its flow-through state and connected to the component.
Figure 13:
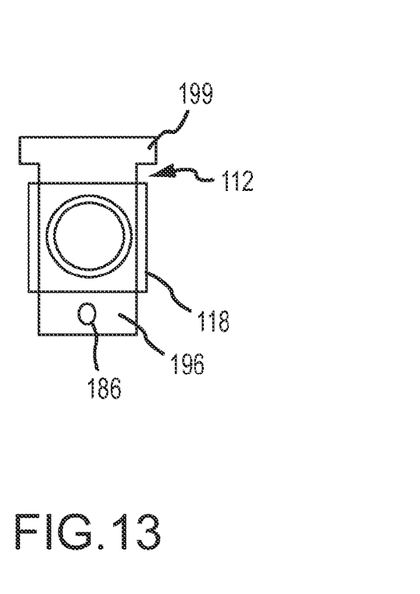
FIG. 13 is a schematic elevation view of a coupling assembly, shown when the fluid valve fitting is in its flow-through state and connected to the component.

FIG. 11 shows the resulting action of the axle cams 174, 176. Relative to the position of the axle cams 174, 176 shown in FIG. 7, the axle cams 174, 176 in FIG. 11 are in an "upstanding" position, forcing the pushrods 180, 182 upward such that the lock ends 186, 192 have engaged the locking holes 197 in the lock mechanisms 188, 194. This pushrod engagement is also shown in FIG. 12 and FIG. 13.

Notably, when the fluid valve fitting 102 is in the flow-through state, the lock mechanisms 188, 194 are locked to inhibit removal of the input port 104 and the output port 106 from the quick disconnect assemblies 118. Referring to FIG. 12 and FIG. 13, the lock mechanism 188 is effectively locked because the pushrod 180 inhibits or prevents actuation of a connector release button 199, which ordinarily must be depressed to disengage the quick disconnect coupling and to allow the input port 104 to be separated from the fluid valve fitting 102. When unlocked, the connector release button 199 facilitates release and removal of the external connectors from the quick disconnect assemblies 118. In practice, the pushrod 180 in the locking hole 197 serves to lock the connector release button 199 in place.

Moreover, when the fluid valve fitting 102 is in the flow-through state, the lock mechanisms 188, 194 allow operation of the actuator assembly 150 for purposes of transitioning the fluid valve fitting 102 to the bypass state. In this regard, the pushrods 180, 182 are free to translate because the lock ends 186, 192 are able to slide within the locking holes 197. Consequently, the pushrods 180, 182 do not keep the axle cams 174, 176 in fixed positions (in contrast, see FIG. 7) and, therefore, the axle cams 174, 176, the axles 162, 164, the valves 124, 132, 140, the gear mechanism, and the actuator assembly 150 are all free to rotate as needed to assume the bypass position. As explained above, when the fluid valve fitting 102 is again in the bypass position, the quick disconnect assemblies 118 can be released with little to no loss of coolant.

It should be appreciated that the figures depict an exemplary embodiment in a schematic and simplified manner. A practical embodiment of the fluid valve fitting 102 may implement the actuator assembly 150, the links between the valves 124, 132, 140, and the links between the valves 124, 132, 140 and the quick disconnect assemblies 118 in any suitable manner. Moreover, the figures show various components and functional elements that might be covered, enclosed, or otherwise hidden from view in a physical deployment of the fluid valve fitting. For example, although the figures clearly show the gear mechanism and pushrods 180, 182, these and other components could be protected within a housing or encased within the same material that is used to fabricate the body of the fluid valve fitting. The figures show these components for ease of description and to facilitate a better understanding of the presented subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A fluid valve fitting comprising:
    an incoming conduit comprising a first inlet, a first outlet, and a first coupling assembly for the first outlet, the first coupling assembly comprising a first lock mechanism;
    an outgoing conduit comprising a second inlet, a second outlet, and a second coupling assembly for the second inlet, the second coupling assembly comprising a second lock mechanism;
    a bypass conduit coupled between the incoming conduit and the outgoing conduit;
    an inflow valve located in the incoming conduit between the first inlet and the first outlet, and configured to be positioned in an open inflow valve state and a closed inflow valve state;
    an outflow valve located in the outgoing conduit between the second inlet and the second outlet, and configured to be positioned in an open outflow valve state and a closed outflow valve state;
    a bypass valve located in the bypass conduit between the incoming conduit and the outgoing conduit, and configured to be positioned in an open bypass valve state and a closed bypass valve state; and
    an actuator assembly coupled to the first lock mechanism, the second lock mechanism, the inflow valve, the outflow valve, and the bypass valve, wherein operation of the actuator assembly concurrently operates the first lock mechanism, the second lock mechanism, the inflow valve, the outflow valve, and the bypass valve.

2. The fluid valve fitting of claim 1, wherein:
operation of the actuator assembly transitions the fluid valve fitting between a bypass state and a flow-through state;
when the fluid valve fitting is in the bypass state, the inflow valve is positioned in the closed inflow valve state, the outflow valve is positioned in the closed outflow valve state, and the bypass valve is positioned in the open bypass valve state to inhibit fluid flow from the first inlet to the first outlet, to inhibit fluid flow from the second inlet to the second outlet, and to allow fluid flow from the first inlet to the second outlet via the bypass conduit; and
when the fluid valve fitting is in the flow-through state, the inflow valve is positioned in the open inflow valve state, the outflow valve is positioned in the open outflow valve state, and the bypass valve is positioned in the closed bypass valve state to allow fluid flow from the first inlet to the first outlet, to allow fluid flow from the second inlet to the second outlet, and to inhibit fluid flow between the incoming conduit and the outgoing conduit.

3. The fluid valve fitting of claim 1, wherein:
operation of the actuator assembly transitions the fluid valve fitting between a bypass state and a flow-through state;
when the fluid valve fitting is in the bypass state, the first lock mechanism is unlocked to enable the first coupling assembly to receive and mate with a first external connector, and the second lock mechanism is unlocked to enable the second coupling assembly to receive and mate with a second external connector; and
when the fluid valve fitting is in the flow-through state, the first lock mechanism is locked to inhibit removal of the first external connector from the first coupling assembly, and the second lock mechanism is locked to inhibit removal of the second external connector from the second coupling assembly.

4. The fluid valve fitting of claim 3, wherein:
when the fluid valve fitting is in the bypass state, the first lock mechanism and the second lock mechanism inhibit operation of the actuator assembly to transition the fluid valve fitting to the flow-through state; and
when the fluid valve fitting is in the flow-through state, the first lock mechanism and the second lock mechanism allow operation of the actuator assembly to transition the fluid valve fitting to the bypass state.

5. The fluid valve fitting of claim 3, wherein:
the first coupling assembly comprises a first quick disconnect assembly configured to mate with the first external connector; and
the second coupling assembly comprises a second quick disconnect assembly configured to mate with the second external connector.

6. The fluid valve fitting of claim 1, further comprising a gear mechanism coupling the inflow valve, the outflow valve, and the bypass valve to the actuator assembly.

7. The fluid valve fitting of claim 6, the gear mechanism comprising a primary gear coupled to the bypass valve, a secondary inflow gear coupled to the inflow valve to cooperate with the primary gear, and a secondary outflow gear coupled to the outflow valve to cooperate with the primary gear.

8. The fluid valve fitting of claim 1, further comprising:
an inflow axle coupled to the inflow valve and configured to rotate in response to actuation of the inflow valve;
an inflow axle cam coupled to the inflow axle and configured to rotate in response to rotation of the inflow axle;
a first linkage assembly operatively associated with the inflow axle cam and configured to actuate the first lock mechanism in response to rotation of the inflow axle cam;
an outflow axle coupled to the outflow valve and configured to rotate in response to actuation of the outflow valve;
an outflow axle cam coupled to the outflow axle and configured to rotate in response to rotation of the outflow axle; and
a second linkage assembly operatively associated with the outflow axle cam and configured to actuate the second lock mechanism in response to rotation of the outflow axle cam.

9. The fluid valve fitting of claim 8, wherein:
the first linkage assembly comprises a first pushrod that cooperates with the first lock mechanism; and
the second linkage assembly comprises a second pushrod that cooperates with the second lock mechanism.

10. The fluid valve fitting of claim 1, wherein:
the first outlet of the incoming conduit is configured for coupling to server equipment; and
the second inlet of the outgoing conduit is configured for coupling to server equipment.

11. A fluid valve fitting comprising:
a conduit comprising an inlet, an outlet, and a locking connector assembly for the outlet;
a rotatable valve located in the conduit and configured to be positioned in an open valve state and a closed valve state;
an axle coupled to the rotatable valve and configured to rotate in response to rotation of the rotatable valve;
a cam coupled to the axle and configured to rotate in response to rotation of the axle;
a pushrod having a first end that cooperates with the cam and having a second end that cooperates with the locking connector assembly, wherein rotation of the cam translates the pushrod; and
an actuator assembly coupled to the rotatable valve to transition the rotatable valve between the open valve state and the closed valve state, wherein operation of the actuator assembly rotates the rotatable valve while concurrently operating the locking connector assembly via the pushrod; wherein:
operation of the actuator assembly transitions the fluid valve fitting between an open fitting state and a closed fitting state;
when the fluid valve fitting is in the closed fitting state, the locking connector assembly is unlocked to enable the locking connector assembly to receive and mate with an external connector; and
when the fluid valve fitting is in the open fitting state, the locking connector assembly is locked to inhibit removal of the external connector from the locking connector assembly.

12. The fluid valve fitting of claim 11, wherein:
the locking connector assembly comprises a gate having a connector release button that facilitates release and removal of the external connector from the locking connector assembly; and
when the fluid valve fitting is in the open fitting state, the pushrod engages the gate to inhibit actuation of the connector release button.

13. A fluid valve fitting comprising:
a conduit comprising an inlet, an outlet, and a locking connector assembly for the outlet;

a rotatable valve located in the conduit and configured to be positioned in an open valve state and a closed valve state;

an axle coupled to the rotatable valve and configured to rotate in response to rotation of the rotatable valve;

a cam coupled to the axle and configured to rotate in response to rotation of the axle;

a pushrod having a first end that cooperates with the cam and having a second end that cooperates with the locking connector assembly, wherein rotation of the cam translates the pushrod; and an actuator assembly coupled to the rotatable valve to transition the rotatable valve between the open valve state and the closed valve state, wherein operation of the actuator assembly rotates the rotatable valve while concurrently operating the locking connector assembly via the pushrod; wherein:

when the fluid valve fitting is in the closed fitting state, the locking connector assembly inhibits operation of the actuator assembly to transition the fluid valve fitting from the closed fitting state to the open fitting state; and when the fluid valve fitting is in the open fitting state, the locking connector assembly allows operation of the actuator assembly to transition the fluid valve fitting from the open fitting state to the closed fitting state.

14. The fluid valve fitting of claim 13, wherein:
the locking connector assembly comprises a gate having a connector release button that facilitates release and removal of the external connector from the locking connector assembly; and when the fluid valve fitting is in the closed fitting state, the gate inhibits translation of the pushrod, which inhibits rotation of the cam, which inhibits rotation of the rotatable valve into the open valve state.

15. The fluid valve fitting of claim 13, wherein the conduit is configured for coupling to computer equipment to provide coolant to the computer equipment.

16. A fluid valve fitting comprising:
an incoming conduit comprising a first inlet, a first outlet, and a first locking quick disconnect assembly for the first outlet;

an outgoing conduit comprising a second inlet, a second outlet, and a second locking quick disconnect assembly for the second inlet;

a bypass conduit coupled between the incoming conduit and the outgoing conduit;

an inflow valve located in the incoming conduit between the first inlet and the first outlet, and configured to be rotated about an inflow axle between an open inflow valve state and a closed inflow valve state;

an outflow valve located in the outgoing conduit between the second inlet and the second outlet, and configured to be rotated about an outflow axle between an open outflow valve state and a closed outflow valve state;

a bypass valve located in the bypass conduit between the incoming conduit and the outgoing conduit, and configured to be rotated about a bypass axle between an open bypass valve state and a closed bypass valve state;

an inflow axle cam coupled to the inflow axle to rotate in response to rotation of the inflow axle;

an outflow axle cam coupled to the outflow axle to rotate in response to rotation of the outflow axle;

an inflow pushrod to engage the inflow axle cam and to cooperate with the first locking quick disconnect assembly;

an outflow pushrod to engage the outflow axle cam and to cooperate with the second locking quick disconnect assembly; and an actuator assembly coupled to the bypass axle, wherein operation of the actuator assembly concurrently operates the bypass valve, the inflow valve, the outflow valve, the first locking quick disconnect assembly, and the second locking quick disconnect assembly.

17. The fluid valve fitting of claim 16, wherein:
the first inlet is configured for fluid-tight coupling to a fluid inflow hose; and the second outlet is configured for fluid-tight coupling to a fluid outflow hose.

18. The fluid valve fitting of claim 16, wherein:
operation of the actuator assembly transitions the fluid valve fitting between a bypass state and a flow-through state;

when the fluid valve fitting is in the bypass state, the inflow valve is positioned in the closed inflow valve state, the outflow valve is positioned in the closed outflow valve state, and the bypass valve is positioned in the open bypass valve state to inhibit fluid flow from the first inlet to the first outlet, to inhibit fluid flow from the second inlet to the second outlet, and to allow fluid flow from the first inlet to the second outlet via the bypass conduit; and when the fluid valve fitting is in the flow-through state, the inflow valve is positioned in the open inflow valve state, the outflow valve is positioned in the open outflow valve state, and the bypass valve is positioned in the closed bypass valve state to allow fluid flow from the first inlet to the first outlet, to allow fluid flow from the second inlet to the second outlet, and to inhibit fluid flow between the incoming conduit and the outgoing conduit.

19. The fluid valve fitting of claim 16, wherein:
operation of the actuator assembly transitions the fluid valve fitting between a bypass state and a flow-through state;

when the fluid valve fitting is in the bypass state, the inflow pushrod allows the first locking quick disconnect assembly to receive and mate with a first external connector, and the outflow pushrod allows the second locking quick disconnect assembly to receive and mate with a second external connector; and when the fluid valve fitting is in the flow-through state, the inflow pushrod engages the first locking quick disconnect assembly to physically lock the first external connector and the first locking quick disconnect assembly together, and the outflow pushrod engages the second locking quick disconnect assembly to physically lock the second external connector and the second locking quick disconnect assembly together.

20. The fluid valve fitting of claim 19 wherein:
when the fluid valve fitting is in the bypass state, the first locking disconnect assembly inhibits translation of the inflow pushrod, which inhibits rotation of the inflow axle cam, which inhibits rotation of the inflow valve to the open inflow valve state, and the second locking disconnect assembly inhibits translation of the outflow pushrod, which inhibits rotation of the outflow axle cam, which inhibits rotation of the outflow valve to the open outflow valve state; and when the fluid valve fitting is in the flow-through state, the first locking disconnect assembly allows translation of the inflow pushrod such that the actuator assembly can be operated to rotate the inflow valve to the closed inflow valve state, and the second locking disconnect assembly allows translation of the outflow pushrod such that the actuator assembly can be operated to rotate the outflow valve to the closed outflow valve state.

21. The fluid valve fitting of claim 16, further comprising a gear mechanism coupling the inflow valve, the outflow valve, and the bypass valve to the actuator assembly.

\* \* \* \* \*